Patented Oct. 2, 1934

1,975,248

UNITED STATES PATENT OFFICE 1,975,248

PRODUCTION OF INDANTHRONES

Oakley M. Bishop, Wilmington, Del., and Melvin A. Perkins, Carneys Point, N. J., assignors to E. I. du Pont de Nemours & Company, Wilmington, Del., a corporation of Delaware No Drawing. Application May 13, 1930, Serial No. 452,122

14 Claims. (Cl. 260—31)

This invention relates to the production of indanthrones (also called N-di-hydro-1:2:1′:2′-anthraquinone-azines). In particular it relates to the production of these compounds from beta-amino-anthra-quinones and especially to the process of treating beta-amino-anthraquinones with fused caustic alkali.

Morton, Dandridge et al., in B. P. 126,112 of April 25, 1918, have disclosed a means of improving the yield of indanthrone in the above mentioned process. The improved procedure comprises adding an oxidizing agent, for example, potassium chlorate to the alkali melt.

Thompson (U. S. Patent 1,580,700 of April 13, 1926) has disclosed another method for improving the yields in this process. His improvement comprises adding an organic hydroxylate of an alkali metal to the fusion mixture. Examples of the compounds employed by Thompson are sodium methylate, sodium ethylate, sodium butylate, sodium phenolate and sodium cresolate.

The novel process devised by Thompson is susceptible to modification by the optional use of an oxidizing agent, as described by Morton, et al., supra. In other words, in carrying out the process devised by Thompson, the fused alkali containing a hydroxylate may contain in addition, an oxidizing agent.

It is an object of this invention to devise an improved process for the manufacture of indanthrone and its derivatives. Other objects are to improve the physical properties of the melt used for the treatment of beta-amino-anthraquinones and specifically to produce better consistency and smoothness in said melt. Other objects will appear hereinafter.

These objects are accomplished by the present invention. It has been found that in the process of fusing beta-amino-anthraquinone or its derivatives, with caustic alkali, higher yields of the corresponding indanthrone are obtained when the reaction is carried out in the presence of the metal derivatives of a plurality of organic hydroxy compounds, than are obtained in their absence or in the presence of any one separately. Particularly high yields are obtained when an oxidizing agent is also present.

The invention will be readily understood from a consideration of the following examples:—

Example I

A mixture of potassium hydroxide (384 grams) and sodium hydroxide (216 grams) is fused and cooled to about 220° C. Sodium-N-butylate (30 grams) is then added under agitation and is followed by potassium chlorate (65 grams) as soon as the melt has cooled to about 205° C. The temperature is adjusted to 195°–200° C., and an intimate mixture of sodium phenolate (40 grams) and 2-amino-anthraquinone (120 grams) is added as rapidly as possible, keeping the temperature at 195°–200° C. The temperature is then maintained at 200° C. for one-half hour, after which it is raised gradually to about 220° C. and maintained for one-half hour. At the end of this time, the melt is poured into water. The dyestuff may be isolated by boiling and aeration of the resultant slurry, filtration, washing and drying.

Example II

A mixture of potassium hydroxide (450 grams) and sodium hydroxide (150 grams) is fused and allowed to cool to 210° C., sodium iso-amylate (40 grams) is quickly added and followed by potassium chlorate (40 grams). When the temperature reaches 195° C., the addition of 2-amino-anthraquinone (120 grams) mixed with the disodium derivative of diethylene glycol (50 grams), is started and continued at such a rate as to maintain the temperature at 190°–200° C. After this operation, the temperature is maintained at 200° C. for one-half hour after which it is raised gradually to 220° C. and maintained for one-half hour. The melt is then drowned and worked up as usual.

Example III

Potassium hydroxide (480 grams) is melted over a free flame and mixed directly with sodium phenolate (60 grams). The melt is cooled under agitation to about 240° C., sodium N-butylate (40 grams) added and the melt further cooled to 205° C. at which point potassium chlorate (60 grams) is added. Then, maintaining the temperature of the melt at as near 200° C. as possible, preferably at 195°–200° C., 2-amino-anthraquinone (120 grams) is added in small portions, as it is absorbed by the fusion mass. After the beta-amino-anthraquinone has all been absorbed, the temperature of the mass is raised gradually to about 220° C., maintained at this temperature for one-half hour and the melt drowned in ten liters of distilled water. The dyestuff is isolated in the usual manner.

Example IV

To a molten mixture of potassium hydroxide (360 grams) and sodium hydroxide (240 grams) is added, at 220° C. and under agitation, the potassium derivative of N-butyl alcohol (30 grams). When this mixture has cooled to 205° C., potassium chlorate (65 grams) is added. The temperature is allowed to drop to 190° C., then an intimate mixture of potassium phenolate (50 grams) and 2-amino-anthraquinone (120 grams) is added at such a rate that the temperature of the mass maintains itself at 190°-200° C. When this has been accomplished the mass is heated, drowned and the dyestuff isolated as in the preceding examples.

*Example V*

A mixture of potassium hydroxide (384 grams) and sodium hydroxide (216 grams) is fused and cooled to about 220° C. Sodium-N-butylate (30 grams) is then added under agitation and is followed by potassium chlorate (65 grams) as soon as the melt has cooled to about 205° C. The temperature is adjusted to 195°-200° C. and an intimate mixture of sodium cresolate (40 grams) and 2-amino-anthraquinone (120 grams) is added as rapidly as possible, keeping the temperature at 195°-200° C. The temperature is then maintained at 200° C. for one-half hour, after which it is raised gradually to about 220° C. and maintained for one-half hour. At the end of this time, the melt is poured into water. The dyestuff was isolated in the usual manner. The cresolate is made from U. S. P. cresol and sodium hydroxide.

*Example VI*

A mixture of resorcinol (m-dihydroxy-benzene) (60 grams) potassium hydroxide (450 grams) and sodium hydroxide (150 grams) is fused and heated at a temperature of 250°-275° C. for one hour, then allowed to cool to 205° C., potassium chlorate (40 grams) added and the melt allowed to cool further to 190° C. A mixture of sodium phenolate (50 grams) and 2-amino-anthraquinone (120 grams) is then added very slowly so as to prevent excessive foaming and maintain the temperature at 190°-200° C. The melt is then heated gradually to about 220° C. and maintained at this temperature for one-half hour. The charge is then drowned and the dyestuff isolated as usual.

*Example VII*

To a well-agitated, molten mixture of sodium and potassium hydroxides (200 grams and 400 grams, respectively), cooled to 220° C., sodium iso-amylate (30 grams) is added, followed by potassium chlorate (65 grams). At a temperature of 190-200° C., there is now slowly added an intimate mixture of 2-amino-anthraquinone (120 grams), sodium phenolate (50 grams), and the disodium derivative of diethylene-glycol (20 grams). These materials are prepared separately and thoroughly mixed (previous to addition to fusion mass), out of contact with moist air. The melt is now gradually heated to 220° C., maintained at 220° C. for one-half hour and drowned as usual.

*Example VIII*

A molten mixture of sodium and potassium hydroxides (200 and 400 grams respectively) is cooled to 205° C. and potassium chlorate (65 grams) added. A dry mixture of sodium phenolate (50 grams), sodium N-butylate (35 grams), and 2-amino-anthraquinone is added in ten minutes at 190°-200° C. The melt is quickly heated to 220° C., maintained at 220° C. for one-half hour, and the dyestuff isolated as in the other examples.

*Example IX*

Molten caustic of the same composition as used in the preceding example, is cooled to about 210° C. and sodium iso-amylate (40 grams) added. The temperature is allowed to drop to 195° C. and a mixture of 2-amino-anthraquinone (120 grams) and the disodium derivative of dihydroxy-diethyl-ether (50 grams) is added as rapidly as the melt will absorb it and so as to maintain the temperature at 190°-200° C. The melt is further stirred one-half to one hour at this temperature, then heated gradually to 220° C., stirred at 220° C. for one-half hour and drowned as usual.

*Example X*

A molten mixture of potassium hydroxide (400 grams) and sodium hydroxide (200 grams) is cooled to 220° C. Sodium-N-butylate (30 grams) is added under agitation. The resulting melt is cooled to 205° C., potassium chlorate (65 grams) added and followed directly by alizarine powder (5 grams). The temperature is now adjusted to 195°-200° C. and a mixture of 2-amino-anthraquinone (120 grams) and sodium phenolate (50 grams) is added slowly at this temperature. The mixture is stirred one-half hour at 195°-200° C., heated to 220° C., and drowned in water.

Considerable variation is permissible in the process above described. The use of an oxidizing agent such as potassium chlorate, potassium nitrate, cerium nitrate, etc., is desirable in attaining maximum yield and quality of dyestuff but the success of the process is not dependent upon the presence of such materials.

Metal alcoholates or hydroxylates have a reducing action and it is, therefore, advisable to employ a larger quantity of oxidizing agent when they are present in the melt. In determining the optimum amount of oxidizing agent, a quantity greater than that used by the other materials and reactions in the fusion melt is employed. This excess is generally directly proportional to the amount of alcoholates used.

The alkali fusion may consist of potassium hydroxide alone or a mixture of potassium and sodium hydroxide.

The order of addition of the various materials to the melt is not fixed. Both (or all) of the organic hydroxylates may be present in the molten alkali before the addition of, or some or all may be added with, the 2-amino-anthraquinone. The best results have been obtained by adding one of these compounds in admixture with the 2-amino-anthraquinone. Such admixtures may be obtained by mixing dry crystals and powders or by evaporating in vacuo aqueous mixtures of caustic, organic hydroxy compounds and 2-amino-anthraquinone. The temperature of the melt may be varied considerably.

As to the proportion of organic hydroxylate in the melt, it is necessary to use only 5% of each hydroxylate based on the total alkali used (or 25% based on 2-amino-anthraquinone) in order to realize the maximum yield of indanthrone. It is often desirable to use more than this quantity of one of the hydroxylates in question for the purpose of obtaining a melt of the desired physical properties.

The extent of unexpected increase in yield of indanthrone which can be realized by the use of two or more hydroxylates in conjunction may be readily shown. Sodium phenolate when used as the only organic hydroxylate in the caustic melt gives rise to at least as good yields of indanthrone as any other single hydroxylate mentioned. The yield given by sodium phenolate is then the maximum to be expected by any combination of these hydroxylates. Accordingly the listed increase over the expected yield is the percentage increase given by the combination in question over that given by sodium phenolate. The figures following are conservative in all instances. All of the compounds given in these examples are the sodium derivatives:—

| Compound in melt | Compound added with 2-amino-anthraquinone. | Approximate yield increase over sodium phenolate |
|---|---|---|
| | | Percent |
| N-butylate | Phenolate | 15 |
| N-butylate | Iso-amylate | 12 |
| N-butylate | Diethylene glycolate | 8 |
| Iso-amylate | Phenolate | 12 |
| Iso-amylate | Diethylene glycolate | 15 |

It will, therefore, be seen that not only has a novel process for the production of indanthrone been produced but a method of obtaining extremely favorable and unexpected results is disclosed.

As many apparent and widely different embodiments of this invention may be made without departing from the spirit thereof, it is to be understood that we do not limit ourselves to the foregoing examples or description except as indicated in the following claims.

We claim

1. The process comprising fusing a mixture of about 384 parts of potassium hydroxide and about 216 parts of sodium hydroxide, adjusting the temperature to about 220° C., adding about 30 parts of sodium-N-butylate, then adding about 65 parts of potassium chlorate as soon as the melt has cooled to about 205° C., adjusting the temperature to about 195°–200° C. and adding a mixture of about 40 parts of sodium phenolate and about 120 parts of beta-amino-anthraquinone, maintaining a temperature of about 200° C., for about one-half hour, thereafter gradually raising the temperature to about 220° C., maintaining such temperature for about one-half hour and finally pouring the melt into water and isolating the dyestuff formed.

2. The process of producing indanthrones which comprises causing a fused caustic alkali to act on a beta-amino-anthraquinone compound in the presence of an alkali metal derivative of an alcohol having a plurality of hydroxyl groups and an alkali metal derivative of an aryl hydroxylate, said aryl compound being carbocyclic and not containing more than three rings.

3. The process of producing indanthrones which comprises causing a fused caustic alkali to act on a beta-amino-anthraquinone compound in the presence of an alkali metal derivative of an aliphatic alcohol and an alkali metal derivative of an aromatic hydroxy compound which is carbocyclic and does not contain more than three rings.

4. The process of producing indanthrones which comprises causing a fused caustic alkali to act on a beta-amino-anthraquinone compound in the presence of an alkali metal derivative of a butyl alcohol and the alkali metal derivative of a phenol.

5. The process of producing indanthrones which comprises causing a fused caustic alkali to act on a beta-amino-anthraquinone compound in the presence of a N-butyl alcohol and the alkali metal derivative of a phenol.

6. The process of producing indanthrones which comprises causing a fused caustic alkali to act on a beta-amino-anthraquinone compound in the presence of sodium-N-butylate and sodium phenolate.

7. The process of producing indanthrones which comprises causing a fused caustic alkali to act on a beta-amino-anthraquinone compound in the presence of an alkali metal derivative of N-butyl-alcohol and the alkali metal derivative of a phenol.

8. The process of producing indanthrones which comprises causing a fused caustic alkali to act on a beta-amino-anthraquinone compound in the presence of an alkali metal derivative of a butyl alcohol and an alkali metal derivative of a hydroxy carbocyclic compound containing not more than three rings.

9. The process of producing indanthrones which comprises causing a fused caustic alkali to act on a beta-amino-anthraquinone compound in the presence of the alkali metal derivatives of a plurality of members of the group consisting of alcohols and hydroxy carbocyclic compounds containing not more than three rings, at least one of which is a member of the benzene series.

10. The process of producing indanthrones which comprises causing a fused caustic alkali to act on a beta-amino-anthraquinone compound in the presence of an alkali metal derivative of an alcohol and an alkali metal derivative of a phenol.

11. The process comprising treating a beta-amino-anthraquinone with fused caustic alkali in the presence of alkali metal derivatives of a plurality of aliphatic alcohols.

12. The process of producing indanthrones which comprises causing a fused caustic alkali to act on a beta-amino-anthraquinone compound in the presence of added alkali metal derivatives of a plurality of members of the group consisting of alcohols and hydroxy carbocyclic compounds containing not more than three rings.

13. The process of producing indanthrones which comprises causing a fused caustic alkali to act on a beta-amino-anthraquinone compound in the presence of added alkali metal derivatives of a plurality of members of the group consisting of alcohols and hydroxy carbocyclic compounds containing not more than three rings, at least one of which is a dihydroxy anthraquinone.

14. The process of producing indanthrones which comprises causing a fused caustic alkali to act on a beta-amino-anthraquinone compound in the presence of added alkali metal derivatives of a plurality of members of the group consisting of alcohols and hydroxy carbocyclic compounds containing not more than three rings, at least one of which is alizarin.

OAKLEY M. BISHOP.
MELVIN A. PERKINS.